United States Patent [19]

Lapeyre et al.

[11] Patent Number: 5,011,453
[45] Date of Patent: Apr. 30, 1991

[54] CENTRIFUGAL CRAB MEAT EXTRACTION APPARATUS

[75] Inventors: James M. Lapeyre; George C. Lapeyre, both of New Orleans, La.

[73] Assignee: The Laitram Corporation, New Orleans, La.

[21] Appl. No.: 9,020

[22] Filed: Jan. 28, 1987

Related U.S. Application Data

[63] Continuation of Ser. No. 776,448, Sep. 16, 1985, abandoned.

[51] Int. Cl.⁵ ............................................. A22C 29/00
[52] U.S. Cl. ....................................................... 452/10
[58] Field of Search .......................................... 452/10

[56] References Cited

U.S. PATENT DOCUMENTS

| | | | |
|---|---|---|---|
| 1,175,037 | 3/1916 | Yancey | 17/71 |
| 1,520,190 | 12/1924 | Lieberman | 17/71 |
| 1,655,583 | 1/1928 | Umrath | 17/71 |
| 2,104,027 | 1/1938 | Dubus | 17/71 |
| 2,771,630 | 11/1956 | Hiller | 17/71 |

Primary Examiner—Willis Little
Attorney, Agent, or Firm—Laurence R. Brown

[57] ABSTRACT

Apparatus for centrifugally extracting meat from crab bodies is disclosed. The apparatus comprises a housing (10) for supporting a rotating drive means (32). A crab body holding means (26) is supported along a spin axis so as to restrain crab body sections in a selected orientation against a support structure (116). The selected orientation is such that when the holding means (26) spins around the spin axis, centrifugal forces on the crab bodies extracts the crab meats through openings in the shell structure. As the meat is propelled from the holding means (26) it is collected by the receiving compartment (30). The support structure (116) contacts and supports the crab body during the spinning of the crab body at specific locations of the crab shell structure to provide the minimum amount of obstruction to the meat being extracted while at the same time minimizing breaking and collapse of the shell structure. Further included is a braking means (34) for stopping the spinning of crab body holding means (26). In a preferred embodiment, the crab body holding means includes a multiplicity of interchangeable similar means.

17 Claims, 6 Drawing Sheets

CENTRIFUGAL CRAB MEAT EXTRACTION APPARATUS

This application is a continuation of Ser. No.776,448 filed Sept. 16, 1985, now abandoned.

TECHNICAL FIELD

This invention relates to an improved apparatus for the extraction of crab meat from the shell structure of the crab by centrifugal force. More particularly, the invention takes advantage of the natural strength of the shell structure of the crab to substantially eliminate shell breakage and shell structure collapse due to the high centrifugal force encountered by high speed spinning. In addition, the apparatus as described herein also allows for rapid loading and unloading of the apparatus by the use of a plurality of interchangeable carrousels such that a loaded carrousel can be used by the apparatus while other carrousels are being loaded with crab bodies. The use of the machine of this invention in combination with a properly prepared crab body results in substantially all of the meat from all cavities of the shell structure being extracted during the process. Further, by properly positioning and supporting the crab body and taking advantage of the natural strength of the crab shell structure, the amount of shell in the extracted meat is also substantially eliminated.

BACKGROUND ART

As will be appreciated by those skilled in the art, the removal of crab meat from the shell structure of the crab body is still primarily performed by hand whereby each crab is handled several times as the meat is extracted. As is well known, although great care may be taken during the hand picking of the crab meat, much meat is left in the shell structure, and a great amount of shell also finds its way into the meat.

In the past, numerous devices have been patented and/or developed which attempted to solve the problem of removing crab meat from the shell structure of the crab. For example, it has been known in the past to use centrifugal or spinning of crab bodies so as to extract the crab meat. For example, U.S. Pat. No. 1,175,037 issued Mar. 14, 1916 is a very early example of such centrifugal spinning to remove crab meat. In that patent, there is seen a centrifugal retainer which has semicircular receiving pans or receptacles for the meat as well as supports or racks for holding the sections of the animal to be shelled. U.S. Pat. No. 1,520,190 issued Dec. 23, 1924 and entitled "EXTRACTING MACHINE" shows a method of extracting meat from shell fish whereby the holder and meat catching means are spun as a unit. Another concept in centrifugal extraction of crab meat includes U.S. Pat. No. 1,655,583 entitled "METHOD AND APPARATUS FOR SHELLING CRUSTACEAN" which provides a motor driven rotating pan having clamps on the underside to secure the crab body's sections so that during the spinning of the crab meat, the sections will be retained and the meat forced out by the centrifugal action.

Another U.S. Pat. No. 2,104,072 entitled "PROCESS OF AN APPARATUS FOR TREATING CRUSTACEA" uses a rotatably driven bowl. In the process of preparing the meat of the crab or other crustacea, the crustacea is subjected to centrifugal action in order to separate the meat from the shell. The same centrifugal action is also used to wash the separated meat.

U.S. Pat. No. 2,522,578 entitled "RECOVERY OF CRAB MEAT" shows a coring machine which processes the crab by producing a crab body core by making a circular cut through the ventral surface of the crab body through the meat and skeletal parts within the body. After removing the core from the crab the meat is extracted by centrifugal action. Another patent which cores and centrifugally removes crab meat is entitled "APPARATUS FOR RECOVERY OF CRAB MEAT" and has U.S. Pat. No. 2,525,604. Still another U.S. Pat. No. 2,771,630 is entitled "CRAB MEAT EXTRACTOR". According to the teachings of that patent, after coring a section of the crab body from the crab, the cored section is rotated about its axis in order to remove the crab meat.

Still another U.S. Pat. No. 3,229,325 entitled "APPARATUS FOR EXTRACTING CRAB MEAT" discloses a centrifugal device having a carriage for holding a plurality of crab body sections. The carriage includes a spinning basket which features a first and second set of plurality of upstanding and generally parallel pins which are supported at their lower ends from a spinning base with pins being arranged in circular patterns and disposed concentrically about the axis of rotation. The second set of the pins is disposed radially inward of the first set. The crabs are placed between the inner and outer sets of pins, and are held down by an annular plate which has apertures that allow the pins to pass through.

A more recent U.S. Pat. No. 3,597,792 entitled "CRAB MEAT EXTRACTOR APPARATUS AND METHOD" discloses a machine and method for extracting meat from the body shells of crabs by the employment of centrifugal force. This device is characterized by structures and procedures which permit operation at different speeds operative to selectively and successively extract the more valuable, relatively large meat sections in substantially unbroken condition. This process is then followed by extraction of the smaller, less valuable flake meat sections by centrifugal rotation at a higher speed. Part of the apparatus utilizes a rotating tray which carries a plurality of radial extending, angularly spaced clips which are pivoted on upstanding hinged lugs and biased by means of a spring to normally urge the forward end of the clip into a closed position. The spring biased clips and cooperating teeth function to securely hold crab half-bodies and restrain them against centrifugal force during rotation of the trays. A single crab half body is secured by each of the clamps.

In another U.S. Pat. No. 3,548,449 entitled "CRAB MEAT EXTRACTION METHOD" there is described a method for removing crab meat from crab body sections which uses two rotating speeds as part of the method. The first rotating speed has a lower speed to remove larger lump sections of crab meat, and a higher speed rotation which rotates the crab body sections to remove the smaller pieces or flake meat.

In addition, U.S. patent application having Ser. No. 593,035 filed on Mar. 23, 1984 by Alfred R. Guglielmo and W. Lee Lockerby, and which application is assigned to the same assignee as the present invention, discloses a centrifugal device for removing crab meat from halves of crab bodies. According to this machine, there are four individual individual crab receiving areas which cooperate with individual meat receiving receptacles. The crab body halves are placed against inwardly leaning pins located in very close proximity to the supported meat receptacles. The crab is placed with the cut middle section against the sloping pins. A hinged lid is then rotated in position to cover both the crab body and the meat receptacle to reduce windage. The machine is then rotationally accelerated to the desired rotational speed for extracting the crab meat. This technique provides a good quality of crab meat with reduced shell, but always requires the preparation of the crab bodies in halves and also is somewhat difficult to load and unload.

Thus a review of the prior art patents and available devices reveals that to date there has not been a simple and inexpensive process which can rapidly process the crab bodies with minimum handling, and which reduces the amount of shell in the meat to an absolute minimum. Therefore, it is an object of this invention to provide apparatus and methods of extracting crab meat without breaking the shell structure.

It is still another object of the present invention to provide apparatus and method for extracting crab meat from the shell structure of the crab body which meat contains a minimal amount of broken shell particles.

It is also an object of the present invention to provide an apparatus and methods which allows the rapid loading and unloading of the centrifugal machine of this invention.

Other objects and advantages will be obvious, and will in part appear hereinafter, and will be accomplished by the present invention which provides the apparatus and method for centrifugally extracting meat from prepared crab bodies. According to the invention, there is provided a base housing which supports and contains a rotating drive means. There is also included a crab body holding means, such as a carrousel, which in a preferred embodiment is rotatably supported and releasably attached to the rotating drive means. The carrousel includes a spin axis and has the primary purpose of providing a means for restraining the shell structure of a crab body in a select orientation during rotation. The crab body is maintained in position with opened meat cavities located opposite a port or meat passage way located at the perimeter of the holding means. The crab body, prior to being subjected to the centrifugal forces of the machine, may be prepared so as to have openings through the shell structure to meat cavities not normally open such that when the holding means spins around the spin axis, the centrifugal forces created on the crab bodies extracts the crab meat through the openings from the restrained shell structure. The centrifugal forces also propel the extracted meat from the holding means through the perimeter port.

In a preferred embodiment, there is also included a spinning meat receiving compartment adjacent the perimeter port which collects the extracted meat as it is propelled through the port and which has a spin axis coaxially and common with the rotatably holding means. The meat receiving compartment or ring is located at a radial distance from the common axis of the holding means which radial distance is greater than the outside perimeter of the holding means. The meat receiving compartment or ring is supported and driven by the rotating drive means and in a preferred embodiment is also releasably attached to the drive means. The receiving compartment and the holding means also cooperate with each other so as to maintain a relative position with each other during the spinning process. There also is included a means for controlling the rotating drive means such that the combination meat receiving compartment and holding means may be accelerated from a non-spinning or "stopped" condition to a maximum rotating speed in a specific or first selected time period. Also included is a brake means for stopping the rotation of the combination in a very short time period.

In a preferred embodiment, the holding means further includes a crab body support structure which is located proximate the perimeter ports and which support structure includes a receiving cup shaped to conform to the inner shell structure of the crab such that when the crab is spun with the belly shell of the crab perpendicular to the radius of the centrifugal force and facing in toward the spin axis, the meat is extracted through the center sections of the prepared whole crab.

BRIEF DESCRIPTION OF THE DRAWINGS

The above features of the present invention will be more clearly understood from consideration of the following description in connection with the accompanying drawings in which.

BEST MODE FOR CARRYING OUT THE INVENTION

Figures 1, 3:
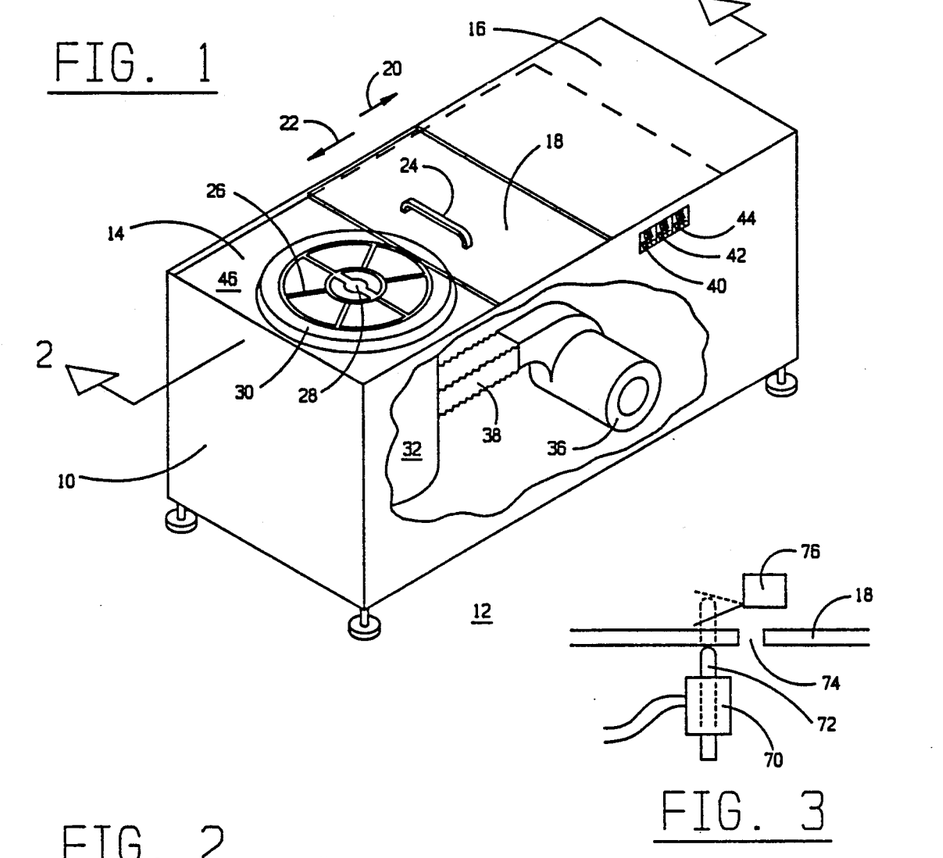
FIG. 1 is perspective view of the crab meat extracting apparatus of this invention.
FIG. 3 shows details of a safety switch which prevents actuation of the centrifuge until the protective cover is closed.

Referring now to FIG. 1, there is shown a perspective view of the crab meat extracting apparatus of this invention. As shown, there is a support structure such as housing 10 which rests upon the floor 12 of a suitable building. In the embodiment shown, the basic support housing 10 is substantially of a box shape. As seen, there is a centrifuge side 14 and a control area side 16 of the machine. The centrifuge side includes a sliding heavy-duty plexiglass cover or shield 18 which is substantially transparent and which slides back and forth in the direction indicated by arrows 20 and 22. Also included is a handle 24 for sliding the plexiglass cover 18. With the cover 18 in the open position, the crab body holding carrousel 26 may be removed from the combination support spindle and drive shaft 28. Likewise, in a preferred embodiment, the meat receiving ring or receptacle 30 may also be readily removed. The means for driving the meat receiving ring 30 will be described in detail hereinafter. However, as is shown in FIG. 1, the combination crab body receiving carrousel 26 and the meat receiving ring 30 which spin in unison with each other are driven by a heavy duty motor 32 with sufficient horsepower to bring the combination carrousel and meat receiving ring to a high speed, such as 3450 RPM, in a minimum amount of time on the order for example of 1½ to 2 seconds. In the embodiment shown, the combination carrousel 26 and meat receiving ring 30 are shown as being connected directly to the shaft of drive motor 32. However, it will be appreciated that the combination could have a different spin axis and the two could be connected by drive belts or chains and pulleys. Also operating in conjunction with the motor 32 is brake 34 such that the combination crab body receiving carrousel 26 and meat receiving ring 30 may be decelerated and brought to a stop in a minimum amount of time also for example in 1½ to 2½ seconds. Brake 34 could be a separate friction brake, or an electrical brake which is separate from or incorporated into motor 32. Because of the excessive amount of energy which must be dissipated during the breaking cycle, and the acceleration cycle, there is included a blower and motor 36, and ducting 38 for forcing large quantities of cooling air into and around the coils of heavy duty motor 32. Within the control portion 16 of the apparatus there are control circuits which allow the adjustment of the acceleration and deceleration speed of motor 32. The control circuitry also includes interlock circuitry to assure that the plexiglass cover 18 is in the completely closed position before the spinning of the carrousel combination may be initiated. Also shown, are ON and OFF control switches 40, 42 and 44. These switches may be used to independently operate various functions of the machine, such as the control circuitry to the motor 32 and the blower 36. The control circuitry in compartment 16 also preferably includes electrical interlocks to assure that the blower 36 cannot be turned off until motor and brake combination 32 and 34 has been cooled to an acceptable preselected temperature.

Figure 2:
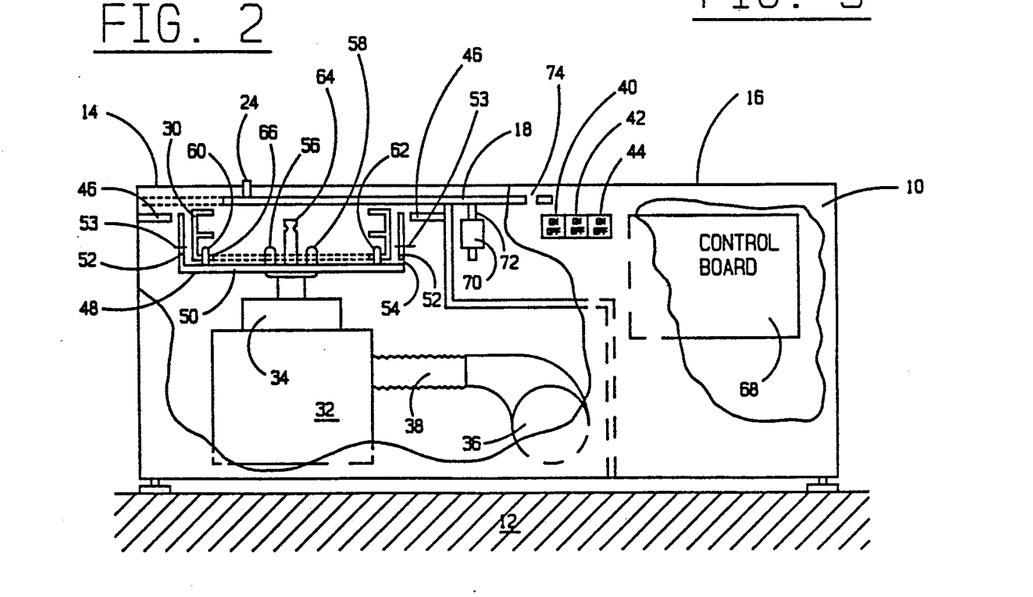
FIG 2 is a cross-section taken along lines 2—2 of the apparatus of FIG. 1, without the crab body holding carrousel in position.
Figure 18:
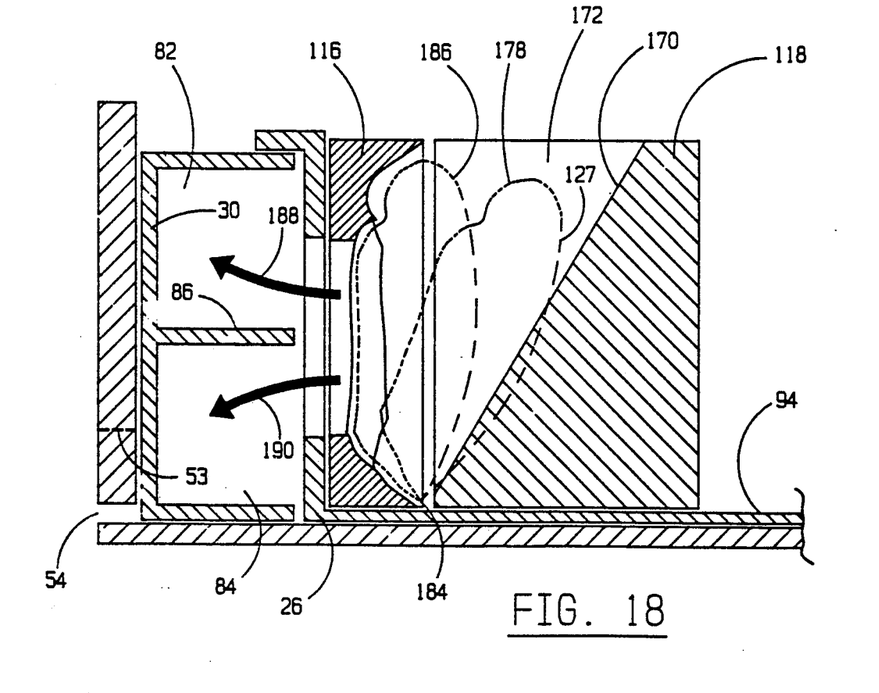
FIG. 18 shows a cross-sectional view of the carrousel, the centrifugal support, the positioning wedge and the meat receiving ring in position.

Referring now to FIG. 2, there is shown a cross-section of the apparatus of FIG. 1 taken along lines 2—2. It will be appreciated of course that elements of the apparatus of FIG. 2 that are common with those of FIG. 1 will carry the same reference number. In addition, all other figures which have common elements will also carry common reference numbers for such common elements. As shown in FIG. 2, and in addition to the structure already described in FIG. 1, it can be seen that a shielding plate member 46 is mounted to the inside portions of the cabinetry 10 and defines a circular aperture for receiving the carrousel 26 and meat receiving ring 30 combination. As can also be seen, there is a cylindrical shaped support pan 48 which is securely mounted to the shaft (not shown) of the heavy duty motor 32. Cylindrical pan 48 has a bottom portion 50 and cylindrical sides 52. Also for convenience there is shown an aperture 54 through sidewall 52 to allow the escape of liquid during the spinning process. Although cylindrical sides 52 as shown in FIGS. 2 and 18 provide maximum support, it will be appreciated that satisfactory operation and support may also be achieved when support sides 52 are reduced in size such that only a lip remains; such as indicated by dashed line 53. Mounted to the bottom surface 50 of the pan 48 is a first pair of locating pins 56 and 58, and a second pair of locating pins 60 and 62. The second pair of pins as can be seen are at an increased radial distance and almost to the sidewall 52 of cylindrical pan 48. Also shown and mounted to the bottom portion 50 of pan 48 is quick-disconnect pin or column 64. As will be discussed later, the quick-disconnect pin 64 operates in conjunction with a cooperating receiving means on the crab body carrousel 26 to be discussed later. Although the crab body receiving carrousel 26 is not in position within pan 48 in FIG. 2, it can be seen that the crab meat receiving ring 30 is in the proper position. Further, it can be seen that locating pins 60 and 62 cooperate with apertures in the bottom surface 66 of ring 30 for providing the rotating motion. In addition, FIG. 2 shows the location of the control circuitry board 68 mentioned with respect to the discussion of FIG. 1. Also as can be more clearly seen in FIG. 3, there is shown an interlock solenoid 70 which operates a plunger or pin 72 and which is located proximate the plexiglass sliding cover 18. As can be seen in the figure, plexiglass cover 18 defines a small aperture 74 which when the cover is in the completely closed position is in register with the pin 72 of solenoid 70. Thus, the solenoid when activated will force the pin 72 against the bottom side of the cover 18 until the pin is in register with aperture 74, which as discussed above is only in the fully closed position. At that time pin 72 will travel through the plexiglass aperture 74 and activate the lever of the interlocking safety electrical switch 76. Thus it will be appreciated that until the cover is in the fully closed position it will be impossible to start the high speed rotation of the combination carrousel 26 and meat ring 30 since it will be impossible to activate the heavy duty motor 32. Once the cycle is complete and the rotational speed reduced to substantially zero, the solenoid 70 will retract the pin 72 from the aperture 74 such that the sliding door 18 may be moved to the fully opened position.

As was discussed above, a meat receiving receptacle or ring 30 is supported in the cylindrical pan 48 and receives its rotational motion by means of the locating pins 60 and 62. Although it is believed that to achieve the best quality of meat, a meat receiving receptacle or ring which rotates with the carrousel is desirable, satisfactory results may also be achieved without the use of such a receptacle such that the meat is simply propelled against the side of a stationary wall. As can be more readily seen in FIGS. 4, 5 and 6, the meat collecting ring 30 includes two apertures 78 and 80 in bottom surface 66 for receiving the locating pins 60 and 62. In addition, as can be seen the meat receiving ring 30 provides two compartment areas 82 and 84 which are for receiving lump and flake meat respectively. Thus, by dividing the meat receiving collection ring 30 by means of the horizontally spaced separating ring 86, the lump meat of the crab and the flake meat may be maintained separately as desired. Also of couse two (2) 360° rings could be stacked with respect to each other to receive the meat. It will be appreciated of course that if it is not desirable to separate the two types of meat from the crab the intermediate ring 86 may be eliminated. In addition, for ease of loading and unloading, instead of using a full ring (i.e. 360°) it may be desirable to subdivide the ring into portions, such as for example into two 180° portions as indicated by the two pairs of dashed porting lines 88 and 90. Of course, the ring could also be subdivided into even a greater number of portions so long as means are provided to hold the portions in position and to provide the centrifugal force. Also, of course, rather than using a full ring, (whether one portion or several), segments or cups located correctly to receive or catch the propelled meat may be used. It should be noted that the inside radius of the meat receiving ring 30 is of a size selected to be just slightly greater than the outside diameter of the crab body receiving carrousel 26 to allow for clearance.

Figures 4, 5, 6, 7, 8:
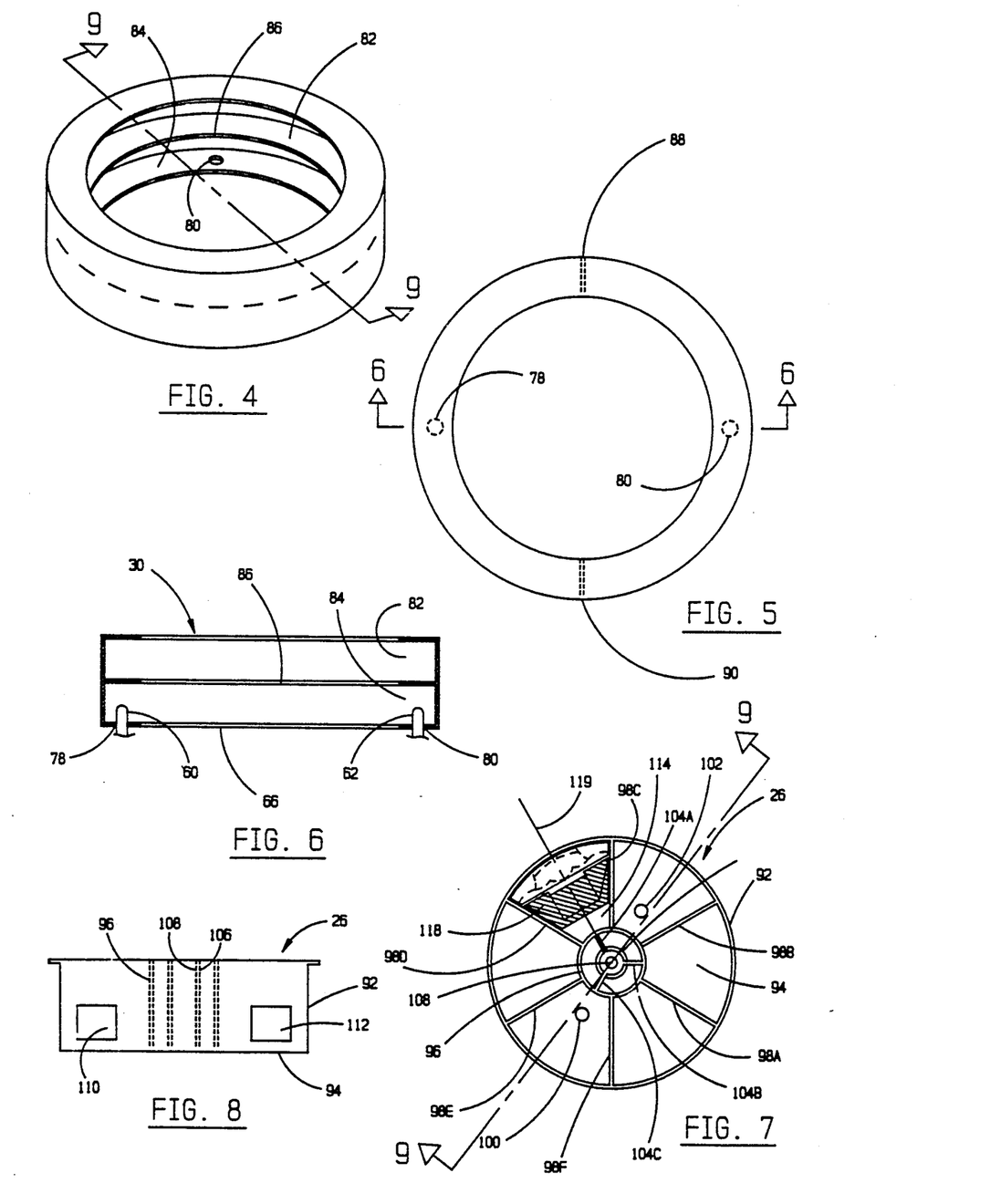
FIGS. 4, 5 & 6 show a perspective view, a top view and a side sectional view respectively of the meat receiving ring or compartment which operates in coo the apparatus of FIGS. 1 & 2 and a crab body holding carrousel shown in FIG. 7.
FIGS. 7 & 8 show a top view and a side view respectively of the crab body holding carrousel which operates in combination with the apparatus in FIGS. 1 and 2 and the crab meat receiving ring or compartment of FIG. 4.

Referring now to FIGS. 7 and 8, there are shown a top and side view respectively of the crab body holding carrousel 26 which operates in combination with the apparatus of FIG. 1 and the meat receiving ring of FIG. 3. As shown, the carrousel includes a perimeter ring 92, and a body bottom support structure 94. There is also included an inner support ring 96 which is joined to the perimeter ring 92 by means of radial separating members 98A, 98B, 98C, 98D, 98E and 98F. For ease of cleaning or to decrease weight, it may be desirable to include perforations in the separate members 98A through 98F. The bottom support structure 94 also defines two apertures 100 and 102 for receiving the locating pins 58 and 56 secured to the bottom 50 of cylindrical pan 48 as discussed heretofore. In addition to the outer separating members 98A through 98F, there are also included inner radial support members such as support members 104A, 104B, and 104C secured between inner support ring 96, to a central support ring 106 which supports a receiving portion 108 of a quick disconnect which cooperates with the pin or column portion 64 mounted to the cylindrical pan 48 of the apparatus as discussed in FIGS. 1 and 2. Thus, it will be appreciated that the carrousel unit 26 may be readily removed or installed within the pan 48 by simply operating the quick disconnect 64/108 and removing one carrousel from the pan 48, and then installing another similar carrousel. Of course, the carrousel could be fixed to the pin or column portion 64. However, for ease of operation, it is believed that a multiplicity of like or similar carrousels with quick dicconnects is superior. As shown in the side view FIG. 8, the carrousel further includes apertures such as apertures 110 and 112 shown in the perimeter ring 92 of the carrousel 26. As will be appreciated, there is one aperture each located with respect to each of the sections formed by separators 94 through 104. Also located in each of the sections but shown only in section 114 for ease of illustration, there is also included a support structure 116 located proximate ring 92 which has a contact surface molded to conform with the shell structure of a crab to be processed on the machine. It has also been found that a wedge member 118 located between support structure 116 and inner ring 96 provides a simple and effective way of properly orienting the crab bodies prior to spinning. Support structure 116 and wedge member 118 will be discussed in detail hereinafter.

Figure 9:
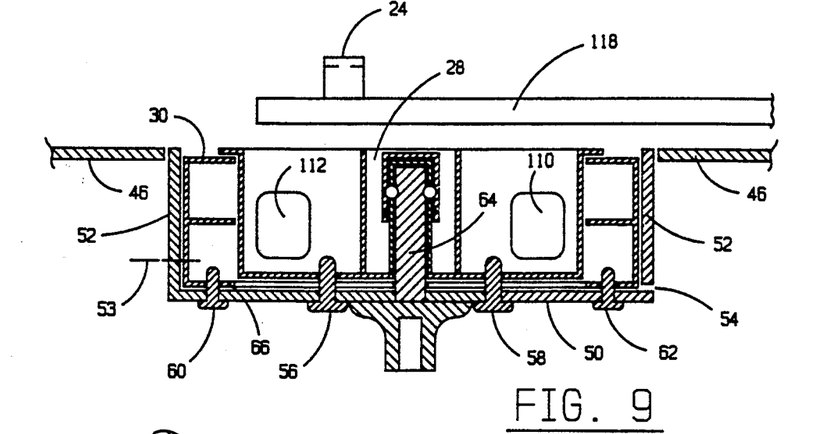
FIG. 9 is a blown-up view of a portion of the apparatus of FIG. 2 in combination with the cross-section along line 9—9 of the meat receiving ring of FIG. 4 and the crab body holding carrousel of FIG. 7.

Referring now to FIG. 9, there is shown a blown-up view of the meat receiving ring 30 and the carrousel 26 combination in place with the spinning pan 48 which is connected to the drive motor 32. This view of the spinning portions of the apparatus shows the close fitting and the relative positions of the individual elements of the invention.

Figure 10:
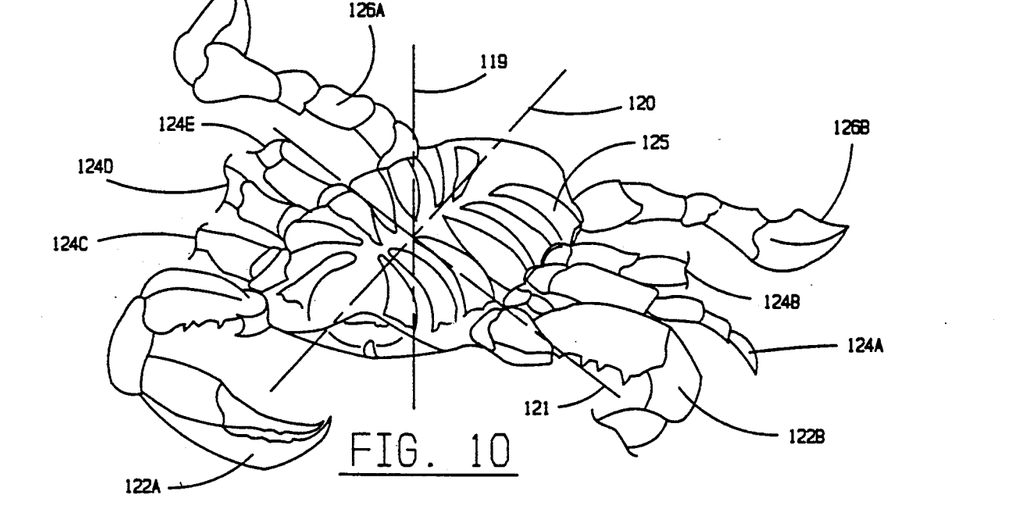
FIGS. 10 & 11 show a top perspective view and a bottom view respectively of a typical unprepared whole crab body with the main carapace shell removed.
Figure 11:
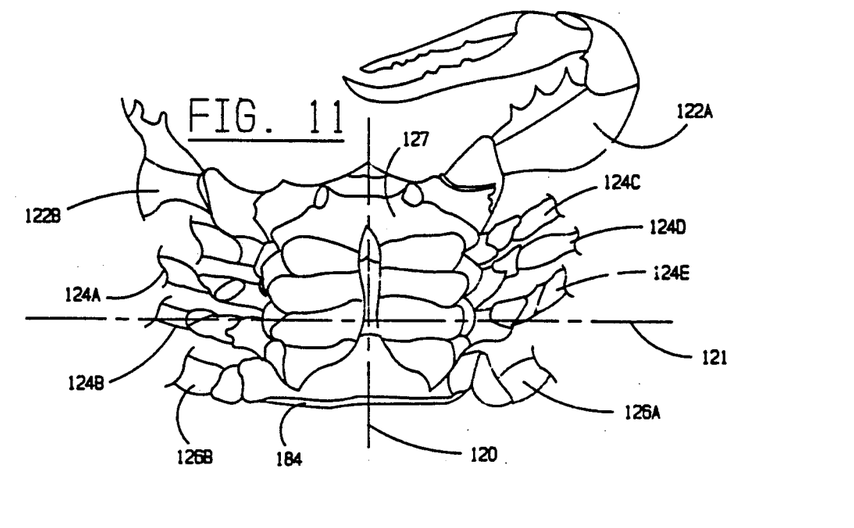

Referring now to FIGS. 10 and 11, there is shown a perspective view and a bottom view respectively of a typical crab body which has not had any specific preparation other than the main carapace shell has been removed. To aid in the explanation FIGS. 10 and 11 also show vertical axis 119, longitudinal axis 120 and lateral axis 121 of the crab body. As can be seen the main claws 122A and 122B, the legs such as logs 124A to 124F and the swimmerets 126A and 126B are still present on the crab body. FIG. 10 also shows the lungs, such as lung 125, and visceral which lie between the carapace and the inner back shell (not shown). FIG. 11 shows the hard belly shell 127 of the crab.

Figure 12:
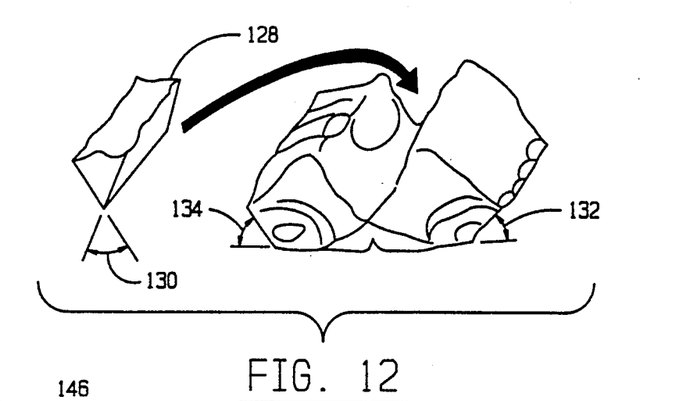
FIG. 12 shows top perspective view of a whole crab body of FIGS. 10 & 11 prepared for having the meat extracted by apparatus according to one embodiment of the present invention.

Now as shown in FIG. 12, there is a whole crab body of the type shown in FIGS. 10 and 11 which has been prepared in a specific manner for having the meat extracted by apparatus according to one embodiment of the present invention. However, although the specific preparation of the crab body as shown in FIG. 12 is believed to be the most effective and will result in the highest yield of meat, it should be understood that the apparatus of this invention will still provide excellent results if the preparation is limited to simply removing the visceral matter, the legs, claws and swimmerets by breaking or cutting without removal of any of the main knuckles. As can be seen, to prepare the under body in the specific manner shown in FIG. 12, a "V" section 128 along the mid-line of the crab has been removed but which "V" section leaves the belly or bottom shell of the crab completely intact. In the embodiment shown, the "V" section is a 90° section as indicated by double headed arcuate arrow 130. However, sections somewhat greater or somewhat less than 90° will also be suitable. In addition, the swimmerets 126A & B, legs 124A-F, and claws 122A & B of the crab have been removed along a selected angle such that the knuckle portion of the leg joints and claw joints are also removed. The embodiment of FIG. 12 shows the legs and claws as being removed at an angle of 45°, as indicated by arcuate arrows 132 and 134, but this angle may also be slightly varied with similar results. By removing the knuckle portions, the crab body is well prepared for giving up the meat from the many intricate cells of the shell structure.

Figure 13:
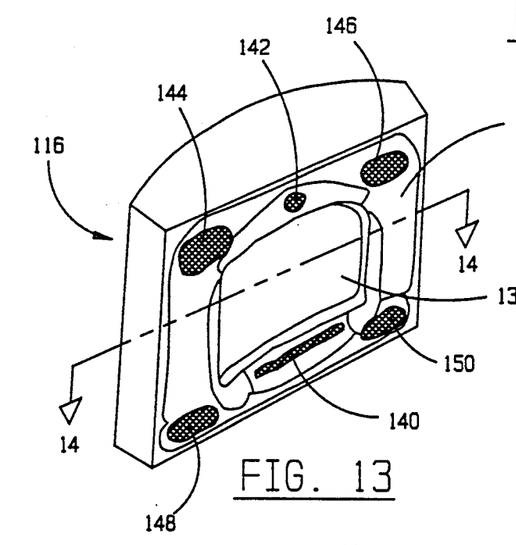
FIGS. 13 & 14 show a perspective view and a top sectional view respectively of a centrifugal support used with the carrousel of FIG. 7 for supporting the prepared whole crab bodies.
Figure 14:
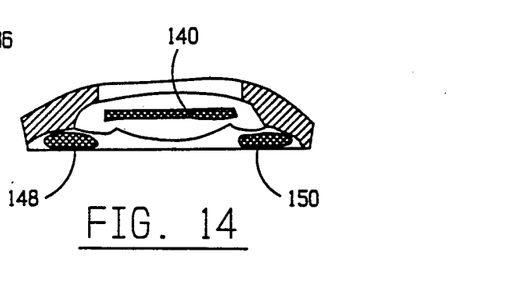
Figure 15:
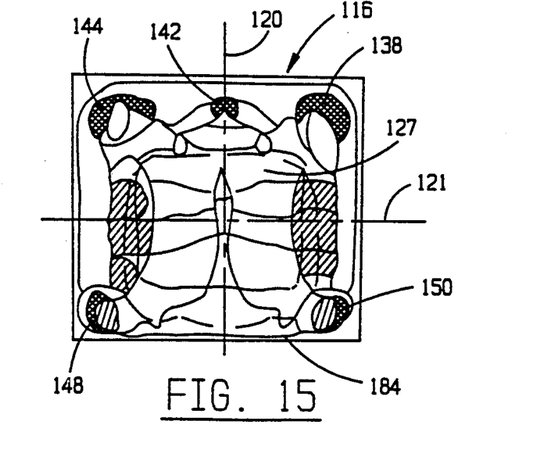
FIGS. 15 & 16 show a back view and a front view respectively of a prepared whole crab body of FIG. 12 in place with the body support of FIG. 13.
Figure 16:
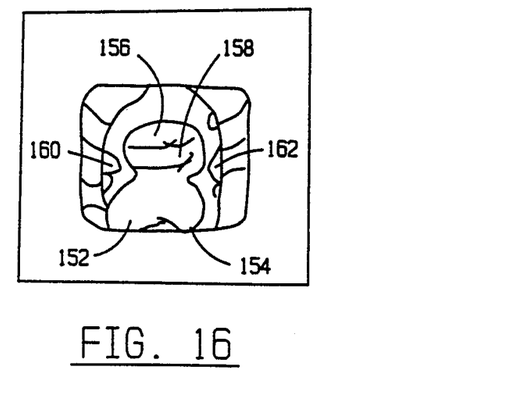

As shown in FIGS. 13 and 14, the support structure 116 of FIG. 7 is shown in perspective and cross-sectional views respectively. As shown, the support structure has somewhat the appearance of a picture frame structure with an aperture 136 through the center. The inside or surface 138 is molded to conform with the inner back shell of the crab which is normally concealed and protected by the carapace of the crab. The structure is specifically shaped to provide contact points with the shell structure such that maximum support is provided and such that the belly shell of the crab will be under compression forces during the spinning process thereby using its natural strength. More specifically, area 140, across the bottom as indicated by cross-hatching, the top center point 142, the main claw shoulder joints support areas 144 and 146, and the swimmerets' sockets joints support areas 148 and 150 provide the necessary support to take advantage of the natural compression strength of the crab belly shell. As clearly seen in FIGS. 15, 16 and 18, the crab is located with the belly shell 127 facing toward the spin axis, the lateral axis 121 positioned tangential or in the direction of spin and the longitudinal axis parallel to the spin axis. When positioned in this manner, the location of the support points of the structure for the crab are provided primarily around the perimeter of the crab body. Thus the aperture 136 simply allows the many openings in the crab structure which occur normally (such as openings 152 and 154) and which may have been enlarged (openings 156 and 158) or opened for the first time (openings 160 and 162) by the preparation process to be unobstructed when the crab is in position. This is shown in FIG. 16. Thus when the crab is spun in the apparatus of this invention with the support structure, there is no obstruction to the meat being forced by the centrifugal forces out of the crab shell structure. None of the prior art known by applicants teaches positioning the crab with its longitudinal axis 120 parallel to the spin axis, much less while at the same time the crab's vertical axis 119 is parallel to a radius extending from the spin axis.

Figure 17:
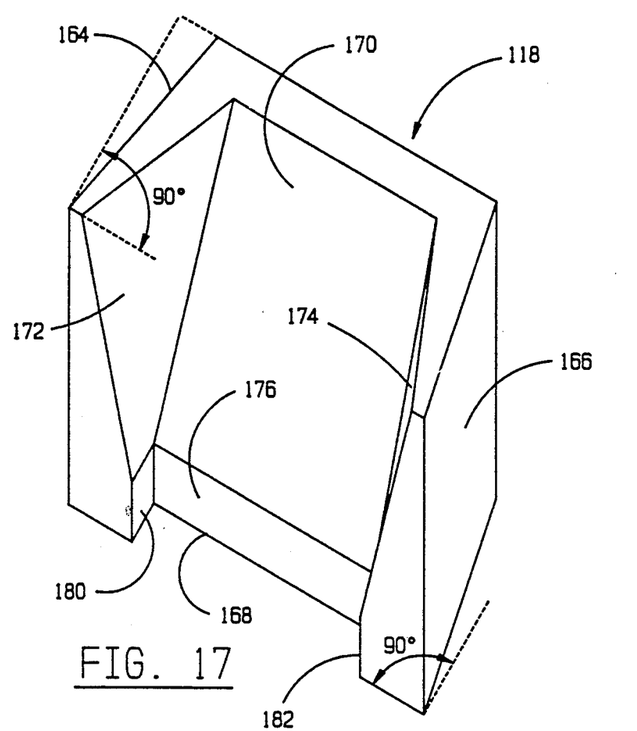
FIG. 17 shows a positioning wedge which operates in conjunction with the centrifugal body support of FIG. 13 and the carrousel of FIG. 7 for properly positioning prepared whole crab bodies prior to spinning.

Referring now to FIG. 17, there is shown a perspective view of wedge member 118. As shown the wedge member 118 has sides 164 and 166 which are positioned against the radial separating members of the carrousel, such as member 98C and 98D of FIG. 7, and in a like manner bottom side 178 rests against bottom support 94 of carrousel 26. The front wedge face 170 assures that the bottom of the crab is properly aligned, and the two side wedge faces 172 and 174 center the crab body, regardless of size, against support structure 126. In addition, the vertical section 176 helps assure that the crab will be in proper vertical alignment. With this configuration, loading of the crab bodies may readily be accomplished by simply dropping the crab body onto the positioning wedge with the back of the crab pointing downward, and the outer belly shell against wedge face 170. When the crab body bottoms out, it will be in the proper orientation for spinning. Referring now to FIG. 18, along with FIG. 17 there is shown a cross-sectional view of support structure 116, wedge member 118, meat receiving ring 30 and carrousel 26 in their cooperating positions. As represented by the dashed outline 178 and as was discussed above, when a prepared crab body is dropped in the carrousel between the support structure 116 and wedge member 118, the crab body will be centered by wedge faces 172 and 174, and the bottom edge 184 of the crab will rest in the space defined by vertical face 176 and front faces 180 and 182 and against front wedge face 170. When the spinning is initiated, the acceleration forces will cause the crab body to rotate along the bottom edge 184 of the shell structure into position and in contact with support structure 116 and as indicated by the dashed outline 186. Addition centrifugal forces then separate the crab meat from the shell structure and propel the meat into the two compartments 82 and 84 as indicated by heavy arrows 188 and 190. The use of the center ring 86 for separating the receiving ring 30 into two compartments, although not necessary for operation, will assure that the very valuable lump meat is received by compartment 84, and the somewhat less valuable flake meat is received by compartment 82.

Thus, to use the machine, a carrousel 26 loaded with six crab bodies is placed in pan 48 and secured to pan 48 by quick disconnect 64/108, the spinning is started and once the meat is extracted, the carrousel removed and a similar preloaded carrousel replaced and the operation continued.

Figure 19:
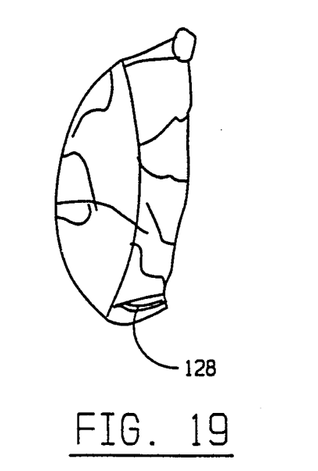
FIG. 19 shows a crab body of FIG. 12 split and prepared for having the meat extracted by apparatus according to another embodiment of the present invention.
Figure 20:
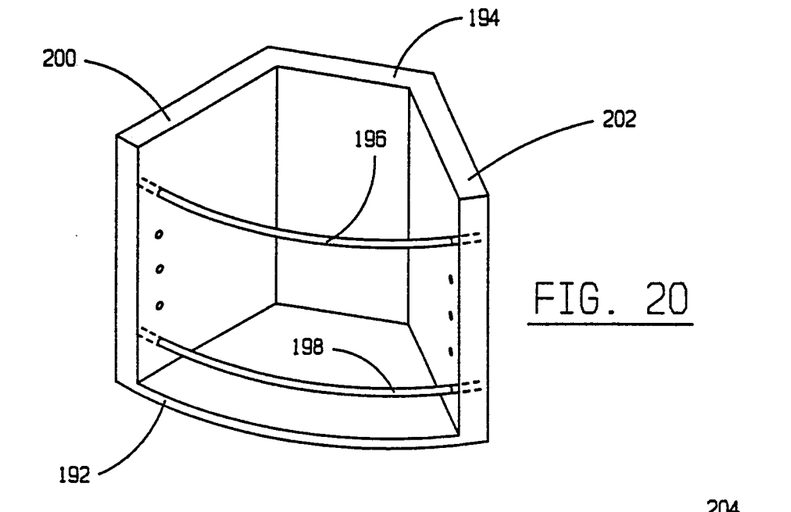
FIGS. 20, 21 and 22 show a perspective view, a front view and a top view respectively of a crab body centrifugal support for use with the carrousel of FIG. 7 for supporting a prepared crab body half.
Figures 21, 22:
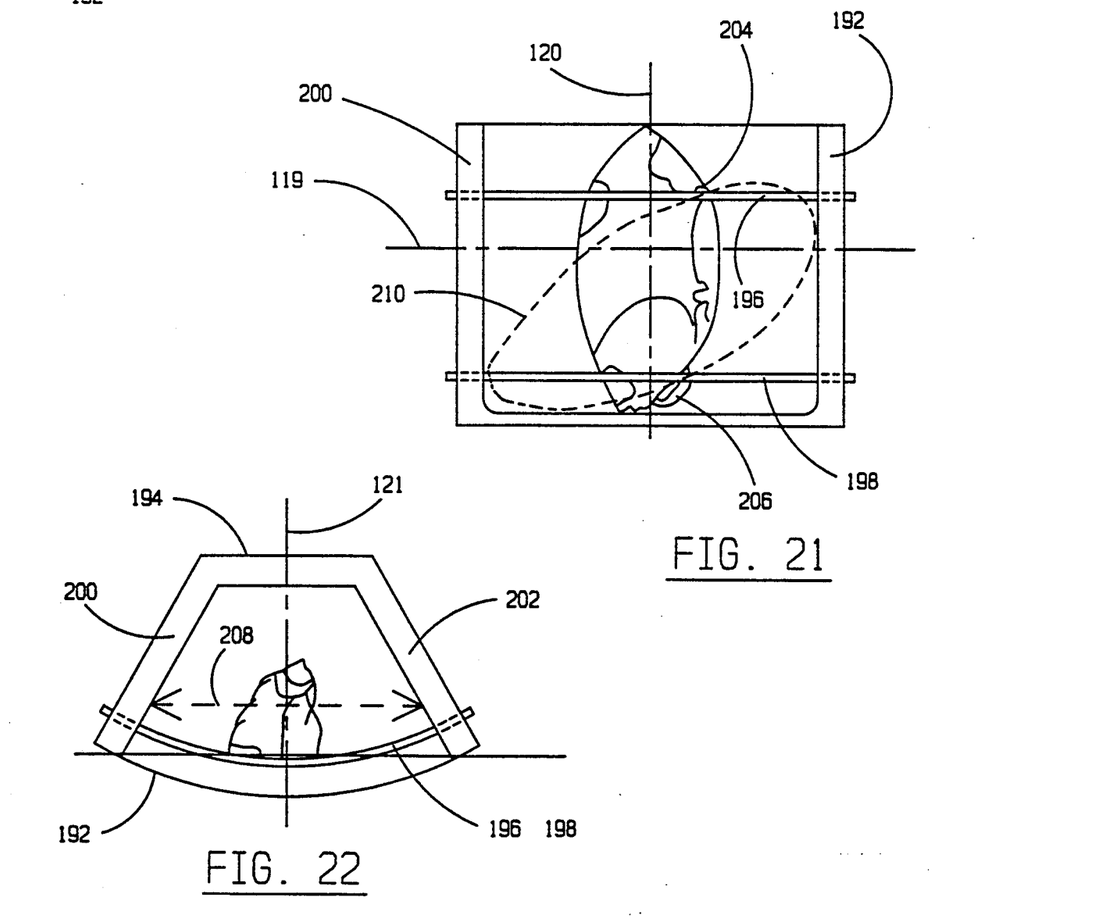

Referring now to FIGS. 20 through 22 there is shown a suitable structure for extracting meat from prepared crab body halves as shown in FIG. 19. Although it is believed that the use of the whole crab body is superior and may result in less shell, it has been found that even the use of half crab bodies in this machine is superior to any other centrifugal crab meat removing apparatus presently available. As shown a suitable structure is open wedge shaped in that the front 192 is wider than the rear 194. A pair of curved bars 196 and 198 are supported by the sides 200 and 202 of the wedge shape structure. According to this embodiment, the upper bar 196 and lower bar 198 are positioned so as to contact the cut shell structure at a juncture of the inner back shell and the knuckles 204 of the claw and knuckles 206 of the swimmerets respectively. Such positioning of the curved bars 196 and 198 minimize the amount of shell breakage and damage. It is also important to construct the width of the structure as indicated by dashed double headed arrow 208 such that if a small crab body lays in the structure at an angle such as shown by dashed outline 210 in FIG. 21 the top bar 196 will still catch a sufficient portion of the shell to prevent the crab body from being thrown through the bars during the spinning process. A multiplicity of structures similar to the structure shown in FIGS. 20, 21 and 22 may simply be located in the pie shaped compartments of carrousel 26 by removing support structure 116 and wedge member 118, or alternately such a multiplicity may be secured to a bottom plate or support member 94 without the cylindrical side walls 92 of carrousel 26. It should be noted that the longitudinal axis 120 of the crab is parallel to the spin axis in this embodiment as it was in the embodiment of FIG. 18. However, according to this embodiment the lateral axis 12 of the crab rather than the vertical axis 119 is positioned parallel to a radius extending from the spin axis. It is not believed that any of the prior art has shown this particular orientation.

Thus, although there have been described to this point particular embodiments of the method and apparatus for centrifugally removing crab meat from prepared crab bodies, it is not intended that such references be considered as limitations upon the scope of this invention, except insofar as set forth in the following claims.

I claim:

1. Apparatus for centrifugally extracting meat from crab bodies comprising:
   a support structure;
   rotary drive means supported by said support structure;
   crab body holding means rotatably supported and releasably attached about a spin axis, said crab body holding means being driven by said drive means and being open at the top such that a plurality of crab bodies may be dropped or placed in said holding means, said crab body holding means further restraining a crab body in a selected orientation adjacent a meat passageway of said holding means, said selected orientation such that when said holding means spins around said spin axis, centrifugal forces on said crab bodies extracts crab meat through openings in the shell structure of said restrained crab body and propels said extracted meat from said holding means through said meat passageway;

meat receiving means operating in combination with said crab body holding means and located outward and peripherally of said holding means for collecting said extracted meat as it is propelled through said passageway, said meat receiving means having a spin axis coaxial and common with said crab body holding means and rotatably supported in an operating position and driven by said rotary drive means, and readily separable from said crab body holding means such that said meat receiving means may remain in said operating position when said crab body holding means is removed from said rotary drive means;

means for controlling said crab body holding means such that said crab body holding means may be accelerated from a non-spinning condition to a selected rotating speed at a first selected acceleration rate; and means for decelerating said rotating crab body holding means.

2. The apparatus of claim 1 wherein said crab body holding means includes a multiplicity of like means, each of said multiplicity readily attachable to and releasable from said rotary drive means to allow ones of said multiplicity to be interchanged with other ones of said multiplicity.

3. The apparatus of claim 1 wherein said crab body holding means further includes a crab body support structure located proximate said meat passageway for contacting and supporting said crab body during the spinning thereof at specific locations on said shell structure to provide a minimum amount of obstruction to the extracted meat and to minimize breaking and collapse of said shell structure.

4. Apparatus for centrifugally extracting meat from crab bodies wherein the longitudinal axis of the crab is defined as extending from the front to the back of the crab, and comprising:

a support structure;

rotary drive means supported by said structure;

crab body holding means rotatably supported in an operating position along a spin axis and driven by said rotary drive means, said crab body holding means adapted so that a plurality of crab bodies may be dropped or placed in said holding means with said longitudinal axis of said crab bodies oriented parallel to such spin axis when said holding means is in said operating position, and for restraining said crab bodies in said orientation against a crab body support structure located adjacent a meat passageway of said holding means, said selected orientation such that when said holding means spins around said spin axis, centrifugal forces on said crab bodies extracts crab meat through openings in the shell structure of said restrained crab body sections and propels said extracted meat from said holding means through said meat passageway;

a crab body support structure located proximate said meat passageway for contacting and supporting said crab body during the spinning thereof at specific locations on said shell structure to provide a minimum amount of obstruction to the extracted meat and to minimize breaking and collapse of said shell structure;

meat receiving means operating in combination with said crab body holding means located outward and peripherally of said holding means for collecting said extracted meat as it is propelled through said meat passageway, said crab body holding means readily separable from said meat receiving means by removing said crab body holding means from said rotary drive means as said meat receiving means remains in its operating position;

means for controlling said crab body holding means such that said crab body holding means may be accelerated from a non-spinning condition to a selected rotating speed at a first selected acceleration rate; and means for decelerating said spinning crab body holding means.

5. The apparatus of claims 4 or 3 wherein said crab body support structure is adapted for spinning prepared whole crab bodies in a desired orientation wherein the belly shell of each crab faces toward said spin axis and is substantially perpendicular to a radius extending from said spin axis, and said crab body support structure comprises a crab body receiving surface for selectively contacting such shell structure along the rear edge, the front center point, and the knuckle joints of the crab claws and swimmerets so as to maintain the whole crab body in said desired orientation and to support the crab body so as to minimize collapse of said shell structure.

6. The apparatus of claim 5 wherein said receiving surface is a surface which partially conforms to the internal back shell of the crab body, and defines an opening in register with said meat passageway of said holding means such that said opening to the meat cavities in said shell structure are not obstructed.

7. The apparatus of claim 4 or 3 wherein said crab body holding means is adapted for spinning halves separated substantially along the longitudinal axis of a whole crab body and for providing support in a desired orientation such that the belly shell of each crab is substantially parallel a radius extending from said spin axis and the position of the crab body exposed by separating along said longitudinal axis is directed outwardly from said spin axis and said crab body support structure comprises a crab body receiving structure for contacting at selected internal cell junction points of the shell along the longitudinal axis of such a half of a shell structure so as to maintain said half of a crab body in said desired orientation and to minimize collapse of said shell structure.

8. Apparatus for centrifugally extracting meat from a crab body separated into halves along a longitudinal axis of the crab comprising:

a support structure;

a rotary drive means supported by said structure;

crab body holding means adapted for being rotated by said drive means in an operating position around a spin axis, said crab body holding means adapted such that a plurality of crab body halves may be dropped or placed in said holding means with said longitudinal axis of said crab body half oriented parallel to said spin axis when said crab body holding means is in said operating position, and adapted to position a crab body half with the lateral axis of the crab body positioned parallel to a radius extending from said spin axis, with the portion of the crab body half exposed by separating along the longitudinal axis facing outward and the longitudinal axis positioned parallel to said spin axis;

meat receiving means located outward and peripherally of said holding means for collecting said extracted crab meat, said meat receiving means having a spin axis coaxial and common with said crab body holding means and rotatably supported in an operating position and driven by said rotary drive means, and readily separable from said crab body holding means such that said meat receiving means may remain in its operating position when said crab body holding means is removed from said rotary drive means;

means for controlling the rotation of said holding means such that said holding means may be accelerated to an angular velocity sufficient to cause meat in said crab bodies to be extracted through opening in the crab body shell structure when said crab bodies are restrained by said holding means; and means for decelerating said rotary crab body holding means.

9. Apparatus for centrifugally extracting meat from crab bodies wherein the vertical axis of the crab is defined as extending through the crab from the top inner back shell to the belly shell of the crab, and comprising;

a support structure;

a rotary drive means supported by said structure;

crab body holding means adapted for rotation by said drive means in an operating position around a spin axis, said crab body holding means further adapted such that a plurality of crab bodies may be dropped or placed in said holding means when said holding means is in said operating position, and adapted to position said crab bodies with said vertical axis of said crab bodies directed radially from said spin axis;

meat receiving means located outwardly and peripherally of said holding means for collecting said extracted crab meat;

means for controlling rotation of said holding means such that said holding means may be accelerated to an angular velocity sufficient to cause meat in said crab bodies to be extracted through openings in the crab body shell when said crab bodies are restrained by said holding means; and means for decelerating said angular velocity.

10. The apparatus of claim 9 wherein said crab body holding means is adapted to further position said crab bodies with the belly shell facing toward said spin axis and the longitudinal axis of said crab is substantially parallel to said spin axis.

11. The apparatus of claim 10 wherein said crab body holding means is adapted to position and support whole crab bodies.

12. The apparatus of claims 1 or 2 wherein said meat receiving means has a spin axis coaxial and common with said rotatably supported holding means and is driven by said driving means such that said meat receiving means and holding means cooperate with each other so as to maintain a relative position with each other during rotation, and is located proximate said meat passageway of said holding means to minimize exposure to air currents as said meat travels from said meat passageway to said meat receiving means.

13. The apparatus of claim 1, 2, 8 or 9 wherein said rotatable supported meat receiving means is releasably supported by said rotary drive means.

14. The apparatus of claim 1, 2, 8 or 9 wherein said meat receiving means is a receiving ring separable into two or more sections.

15. The apparatus of claims 1, 2, 8 or 9 wherein said means for deceleration is a braking means activated by said means for controlling.

16. The apparatus of claims 1, 2, 8 or 9 and further including means for engaging and disengaging said crab body holding means with said rotary drive means.

17. The apparatus of claims 2, 8 or 9 wherein said crab body holding means is fixedly attached to said rotary drive means.

* * * * *